(12) United States Patent
Bopardikar et al.

(10) Patent No.: US 11,416,626 B2
(45) Date of Patent: Aug. 16, 2022

(54) QUERY-AWARE PRIVACY FOR ACCESS CONTROL DATA ANALYTICS

(71) Applicant: Carrier Corporation, Palm Beach Gardens, FL (US)

(72) Inventors: Shaunak D. Bopardikar, Glastonbury, CT (US); Alberto Speranzon, Maple Grove, MN (US); Marina V. Blanton, Lockport, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 427 days.

(21) Appl. No.: 16/382,303

(22) Filed: Apr. 12, 2019

(65) Prior Publication Data
US 2019/0354700 A1 Nov. 21, 2019

Related U.S. Application Data

(60) Provisional application No. 62/672,804, filed on May 17, 2018.

(51) Int. Cl.
| | | |
|---|---|---|
| *G06F 21/60* | (2013.01) | |
| *G06F 21/62* | (2013.01) | |
| *G06K 7/00* | (2006.01) | |
| *H04L 9/40* | (2022.01) | |
| *G06F 21/35* | (2013.01) | |

(52) U.S. Cl.
CPC ............ *G06F 21/604* (2013.01); *G06F 21/35* (2013.01); *G06F 21/6218* (2013.01); *G06K 7/0095* (2013.01); *H04L 63/10* (2013.01)

(58) Field of Classification Search
CPC .... G06F 21/604; G06F 21/6218; G06F 21/35; G06F 21/6227; G06F 21/6245; G06F 7/0095; H04L 63/10; H04L 63/102; G07C 9/27
See application file for complete search history.

(56) References Cited

U.S. PATENT DOCUMENTS

| | | | |
|---|---|---|---|
| 6,836,554 B1 | 12/2004 | Bolle et al. | |
| 7,107,269 B2 | 9/2006 | Arlein et al. | |
| 7,698,250 B2 | 4/2010 | Dwork et al. | |
| 9,075,539 B2 * | 7/2015 | Cyr | ........................ G06F 3/0671 |
| 9,632,858 B2 | 4/2017 | Sasturkar et al. | |
| 9,672,364 B2 * | 6/2017 | Zhang | ................. G06F 21/6245 |

(Continued)

OTHER PUBLICATIONS

Ning Cao et al., "Privacy-Preserving Multi-keyword Ranked Search over Encrypted Cloud Data", Journal IEEE Transactions on Parallel and Distributed Systems, Jan. 2014, pp. 222-233, vol. 25, issue 1, IEEE Press, Piscataway, NJ.

(Continued)

*Primary Examiner* — Khoi V Le
(74) *Attorney, Agent, or Firm* — Bachman & LaPointe, P.C.

(57) ABSTRACT

A method comprises: maintaining a database (120, 130) of access control events; dividing a portion (138) of the database into shares (140A, 140B, 140C); passing the respective shares to respective third party servers (44A, 44B, 44C); processing the shares in the respective third party servers; passing output of the processing to a further server (40) in common; and processing the output on the further server.

18 Claims, 9 Drawing Sheets

(56) References Cited

U.S. PATENT DOCUMENTS

| | | | | |
|---|---|---|---|---|
| 2004/0221118 | A1* | 11/2004 | Slater | G06F 21/10 |
| | | | | 711/163 |
| 2010/0024045 | A1* | 1/2010 | Sastry | H04W 12/02 |
| | | | | 726/28 |
| 2012/0331088 | A1* | 12/2012 | O'Hare | H04L 67/1097 |
| | | | | 709/214 |
| 2014/0359552 | A1 | 12/2014 | Misra et al. | |
| 2015/0161398 | A1* | 6/2015 | De Cristofaro | G06F 21/60 |
| | | | | 726/26 |
| 2015/0235051 | A1* | 8/2015 | Fawaz | G06F 21/6245 |
| | | | | 726/26 |
| 2018/0173886 | A1* | 6/2018 | Dryer | H04L 12/1822 |

OTHER PUBLICATIONS

Katrina Ligett et al., "Accuracy First: Selecting a Differential Privacy Level for Accuracy-Constrained ERM", Advances in Neural Information Processing Systems 30, May 2017, pp. 2563-2573, Neural Information Processing Systems Foundation, Inc., San Diego, California.

Yousra Abdul Alsahib S. Aldeen et al., "A Comprehensive Review on Privacy Preserving Data Mining", SpringerPlus, Nov. 12, 2015, 4:694, Springer Publishing, New York, NY.

Vinoth Kumar Jambulingam et al., "An Extensive Review on Privacy Preserving Methods in Data Mining", ARPN Journal of Engineering and Applied Sciences, Dec. 2016, pp. 13866-13877, vol. 11, No. 23, Asian Research Publishing Network, Islamabad, Pakistan.

Syam Kumar Pasupuleti et al., "An efficient and secure privacy-preserving approach for outsourced data of resource constrained mobile devices in cloud computing", Journal of Network and Computer Applications, Feb. 9, 2016, pp. 12-22, Elsevier Ltd., Amsterdam, Netherlands.

Bharath K. Samanthula et al., "Privacy-Preserving Complex Query Evaluation over Semantically Secure Encrypted Data", Sep. 2014, Purdue University, West Lafayette, Indiana.

Ning Cao et al., "Privacy-Preserving Query over Encrypted Graph-Structured Data in Cloud Computing", 31st International Conference on Distributed Computing Systems, Jul. 25, 2011, IEEE Press, Piscataway, NJ.

Do Le Quoc et al., "Privacy Preserving Stream Analytics, The Marriage of Randomized Response and Approximate Computing", Jan. 1, 2017, Cornell University, Ithaca, NY.

Fatih Emekci et al., "Privacy Preserving Query Processing using Third Parties", 22nd International Conference on Data Engineering (ICDE'06), Apr. 26, 2006, p. 27, IEEE Computer Society, Washington, DC.

Zhu Xiangyang et al., "MUSE: An Efficient and Accurate Verifiable Privacy-Preserving Multikeyword Text Search over Encrypted Cloud Data", Security and Communication Networks, Jul. 11, 2017, vol. 2017, Hindawi Limited, London, United Kingdom.

Martin Pettai et al., "Combining Differential Privacy and Secure Multiparty Computation Development", Proceedings of the 31st Annual Computer Security Applications Conference, Dec. 7, 2015, pp. 421-430, ACM, Association for Computing Machinery, New York, NY.

"Physical Access Solutions, Contactless Smart Card", Sep. 19, 2012, HID Global, Austin, TX.

"BlueDiamond Mobile Readers", Jan. 31, 2017, Lenel, United Technologies Corporation, Farmington, CT.

Product Data Sheet, "MIFARE Classic EV1 1K-Mainstream Contactless Smart Card IC for Fast and Easy Solution", Nov. 23, 2017, NXP Semiconductors, Eindhoven, Netherlands.

Rosario Gennaro et al., "Simplified VSS and Fast-Track Multiparty Computations with Applications to Threshold Crypotgraphy", PODC '98 Proceedings of the seventeenth annual ACM symposium on Principles of distributed computing, Jun. 1998, pp. 101-111, vol. 98, ACM Association for Computing Machinery, New York, NY.

Ulfar Erlingsson et al., "RAPPOR: Randomized Aggregatable Privacy-Preserving Ordinal Response", Proceedings of the 2014 ACM SIGSAC Conference on Computer and Communications Security, Nov. 2014, pp. 1054-1067, ACM Association for Computing Machinery, New York, NY.

Cynthia Dwork et al., "The Algorithmic Foundations of Differential Privacy, Foundations and Trends in Theoretical Computer Science", Proceedings of the ACM on Programming Languages, Sep. 2017, ACM Association for Computing Machinery, New York, NY.

Yihua Zhang et al., "PICCO: A General-Purpose Compiler for Private Distributed Computation", Proceedings of the 2013 ACM SIGSAC conference on Computer & Communications Security, Nov. 2013, pp. 813-826, ACM Association for Computing Machinery, New York, NY.

Adi Shamir, Programming Techniques, "How to Share a Secret", Communications of the ACM, Nov. 1979, pp. 612-613, vol. 22, ACM Association for Computing Machinery, New York, NY.

Bryan Parno et al., "Pinocchio: Nearly Practical Verifiable Computation", 2013 IEEE Symposium on Security and Privacy, May 19, 2013, pp. 238-252, IEEE Computer Society, Washington, DC.

Craig Gentry, "Fully Homomorphic Encryption Using Ideal Lattices", Proceedings of the forty-first annual ACM symposium on Theory of computing, Jun. 2009, pp. 169-178, ACM Association for Computing Machinery, New York, NY.

Rosario Gennaro et al., "Non-Interactive Verifiable Computing: Outsourcing Computation to Untrusted Workers", Annual Cryptology Conference, Aug. 55, 2010 (submitted May 27, 2010), pp. 465-482, Springer, Berlin, Heidelberg, Germany.

* cited by examiner

PANEL / SERVER ACCESS PERMISSIONS DATABASE 110

| | CREDENTIAL ID | ATTRIBUTES | | | ASSIGNED ACCESS | | |
| --- | --- | --- | --- | --- | --- | --- | --- |
| | | DEPARTMENT | COMPANY | LOCATION | PANEL ID | READER ID | TIME WINDOW |
| 1) | 123 | S | Y | L1 | P2 | R1 | T1 |
| 2) | 123 | S | Y | L1 | P2 | R5 | T1 |
| 3) | 123 | S | Y | L1 | P3 | R6 | T2 |
| 4) | 456 | T | Z | L5 | P6 | R2 | T1 |
| 5) | 456 | T | Z | L5 | P1 | R4 | T3 |
| ... | ... | ... | ... | ... | ... | ... | ... |

FIG. 3

EVENTS DATABASE 120

| TYPE | CREDENTIAL ID | TIME | READER ID | PANEL ID | READ TYPE |
|---|---|---|---|---|---|
| ACCESS GRANTED | 123 | 2018/02/08/11:00 | R1 | P2 | BLUETOOTH |
| ACCESS DENIED | 456 | 2018/02/08/17:00 | R2 | P6 | RFID |
| COMMUNICATION LOST TO PANEL | 789 | 2018/02/09/08:00 | R5 | P2 | BLUETOOTH |
| COMMUNICATION LOST TO SERVER | 1357 | 2018/02/09/09:25 | R3 | P1 | RFID |
| ACCESS DENIED | NULL | 2018/02/09/11:00 | R4 | P1 | RFID |
| ACCESS DENIED | NULL | 2018/02/09/11:01 | R4 | P1 | RFID |

FIG. 4

MODIFIED DATABASE 130

| TYPE | CREDENTIAL ID | TIME | READER ID | PANEL ID | READ TYPE | NEW EVENT |
|---|---|---|---|---|---|---|
| ACCESS GRANTED | 123 | 2018/02/08/11:00 | R1 | P2 | BLUETOOTH | 0 |
| ACCESS DENIED | 456 | 2018/02/08/17:00 | R2 | P6 | RFID | 0 |
| COMMUNICATION LOST TO PANEL | 789 | 2018/02/09/08:00 | R5 | P2 | BLUETOOTH | 0 |
| COMMUNICATION LOST TO SERVER | 1357 | 2018/02/09/09:25 | R3 | P1 | RFID | 0 |
| ACCESS DENIED | NULL | 2018/02/09/11:00 | R4 | P1 | RFID | 1 |
| ACCESS DENIED | NULL | 2018/02/09/11:01 | R4 | P1 | RFID | 1 |

| TYPE | CREDENTIAL ID | TIME | READER ID | PANEL ID | READ TYPE | NEW EVENT | NEW EVENT TYPE |
|---|---|---|---|---|---|---|---|
| ACCESS GRANTED | 123 | 2018/02/08/11:00 | R1 | P2 | BLUETOOTH | 0 | 1 |
| ACCESS DENIED | 456 | 2018/02/08/17:00 | R2 | P6 | RFID | 0 | 0 |
| COMMUNICATION LOST TO PANEL | 789 | 2018/02/09/08:00 | R5 | P2 | BLUETOOTH | 0 | 1 |
| COMMUNICATION LOST TO SERVER | 1357 | 2018/02/09/09:25 | R3 | P1 | RFID | 0 | 1 |
| ACCESS DENIED | NULL | 2018/02/09/11:00 | R4 | P1 | RFID | 1 | 0 |
| ACCESS DENIED | NULL | 2018/02/09/11:01 | R4 | P1 | RFID | 1 | 0 |

MODIFIED DATABASE 130'

138 — NEW EVENT
139 — NEW EVENT TYPE

COMPLEMENT:
0 1
1 0
0 1
0 1
0 1
0 1

FIG. 7

MODIFIED DATABASE

| TYPE | CREDENTIAL ID | TIME | READER ID | PANEL ID | READ TYPE | R1 | ... | R4 | R5 |
|---|---|---|---|---|---|---|---|---|---|
| ACCESS GRANTED | 123 | 2018/02/08/11:00 | R1 | P2 | BLUETOOTH | 0 | | 0 | 0 |
| ACCESS DENIED | 456 | 2018/02/08/17:00 | R2 | P6 | RFID | 0 | | 0 | 0 |
| COMMUNICATION LOST TO PANEL | 789 | 2018/02/09/08:00 | R5 | P2 | BLUETOOTH | 0 | | 0 | 0 |
| COMMUNICATION LOST TO SERVER | 1357 | 2018/02/09/09:25 | R3 | P1 | RFID | 0 | | 0 | 0 |
| ACCESS DENIED | NULL | 2018/02/09/11:00 | R4 | P1 | RFID | 0 | | 0 | 0 |
| ACCESS DENIED | NULL | 2018/02/09/11:01 | R4 | P1 | RFID | 0 | | 0 | 0 |
| ACCESS GRANTED | 456 | 2018/02/09/11:01 | R4 | P1 | RFID | 0 | | 1 | 0 |

FIG. 9

QUERY-AWARE PRIVACY FOR ACCESS CONTROL DATA ANALYTICS

CROSS-REFERENCE TO RELATED APPLICATION

Benefit is claimed of U.S. Patent Application No. 62/672,804, filed May 17, 2018, and entitled "Query-Aware Privacy for Access Control Data Analytics", the disclosure of which is incorporated by reference herein in its entirety as if set forth at length.

BACKGROUND

The disclosure relates to information management security. More particularly, the disclosure relates to management of multi-field databases to facilitate external processing while maintain security, particularly of personal information.

One example of a database having various fields of personal information is access control systems. In such systems, access devices such as cards may store data and the associated credential management database may store more. Various aspects of managing the access control system involve processing of such data both in-house and outside.

In an example of an access control system 20 (FIG. 1) management, a company named "ACME" has one or more facilities (buildings 22, complexes, etc.) and uses an access control system designed, developed and/or maintained by a vendor named "SecCorp". SecCorp needs access to various pieces of the data for purposes including monitoring the health of the system 20 and its components (e.g., against electrical/electronic hardware problems, mechanical problems, and software bugs) and optimizing its hardware and/or software configuration (e.g., adding or changing hardware or software features). SecCorp needs access to data stored in the access control system 20 while limiting the opportunities for and possible effects of any compromise of such data.

The exemplary access control system at a broad level comprises access credentials 24 (FIG. 2) for each employee (e.g., each employee may have an access credential in the form of a card or fob and may also have an access credential in a device such as a smart phone). Exemplary cards are formed as badges (i.e., bearing a photograph and name of the user and sometimes company-identifying information and sometimes other information like a security level).

Data stored on badges (for ease of reading "badge" will represent other credential devices unless explicitly indicated to the contrary) and/or the access control system's database(s) may include employee-identifying information (e.g., personal information such as name (or separate name fields), sex, social security number (SSN), employee ID number, and the like and biometric information, such as digital fingerprints, photo, and the like), employment status information (e.g., date of joining of the employee, type of employee (temporary, intern, permanent, executive), level of the employee within organization, specific access time or other limitations), and badge-related information (e.g., the date the badge was last programmed, badge serial number, and the like).

Monitoring the performance of the system 20 necessarily involves communication of employee data. Care must be taken when handling data from the badges. Just portions of the data stored on the badge and the history of the badge's use may, in turn, be used to determine other of the data on the badge and yet further information about the employee. For example, even if the employee's name and title (if stored on the badge) are excluded from what is used in system monitoring, the limited data used may be sufficient to recreate the excluded data.

For example, using publicly available information such as from career websites, social media, or commercial databases, an employee may be identified from the date of joining of the employee alone or in combination with other data such as location data. Also, an employee's schedule can be inferred from the use of the badge throughout the facility at different times of the day.

SUMMARY

One aspect of the disclosure involves a method comprising: maintaining a database of access control events; dividing a portion of the database into shares; passing the respective shares to respective third party servers; processing the shares in the respective third party servers; passing output of the processing to a further server in common; and processing the output on the further server.

In one or more embodiments of any of the foregoing embodiments, the processing the output on the further server includes combining the shares.

In one or more embodiments of any of the foregoing embodiments, the processing comprises diagnosing a malfunctioning device.

In one or more embodiments of any of the foregoing embodiments, the diagnosing the malfunctioning device comprises diagnosing a malfunction in a credential device.

In one or more embodiments of any of the foregoing embodiments, the diagnosing the malfunctioning device comprises diagnosing a malfunction in a reader.

In one or more embodiments of any of the foregoing embodiments, the portion of the access events data contains credential holder identifying information.

In one or more embodiments of any of the foregoing embodiments, the dividing obscures the credential holder identifying information.

Another aspect of the disclosure involves an access control system comprising: a plurality of credential devices; a plurality of readers for reading the credential devices; and one or more servers coupled to the readers programmed to: maintain an access events database; divide a portion of the access events database into shares; and pass the respective shares to respective third party servers.

In one or more embodiments of any of the foregoing embodiments, the plurality of credential devices includes smartphones and RFID cards or badges.

In one or more embodiments of any of the foregoing embodiments, a method for using the system comprises: the one or more servers maintaining the access events database; the one or more servers divide the portion of the access events database into shares; and the one or more servers passing the respective shares to the respective third party servers.

In one or more embodiments of any of the foregoing embodiments, the portion of the access events data contains evidence of a malfunctioning device.

In one or more embodiments of any of the foregoing embodiments, the portion of the access events data contains credential holder identifying information.

Another aspect of the disclosure involves a method comprising: maintaining a database of access control events; dividing a portion of the database into shares; passing the respective shares to respective third party servers; and receiving a processed result.

Another aspect of the disclosure involves a method comprising: receiving processed shares of a database of access control events from respective third party servers; further processing the processed shares on a further server to produce a combined output.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is a tabular diagram of an access permissions database.

FIG. 4 is a tabular diagram of an event records database.

FIG. 5 is a tabular diagram of a modification/augmentation of the event records database of FIG. 4.

FIG. 7 is a tabular diagram of an alternative modification/augmentation of the event records database of FIG. 4.

FIG. 9 is a tabular diagram of an alternative modification/augmentation of the event records database of FIG. 4 with different data for purposes of illustration.

Like reference numbers and designations in the various drawings indicate like elements.

DETAILED DESCRIPTION

Figure 1:
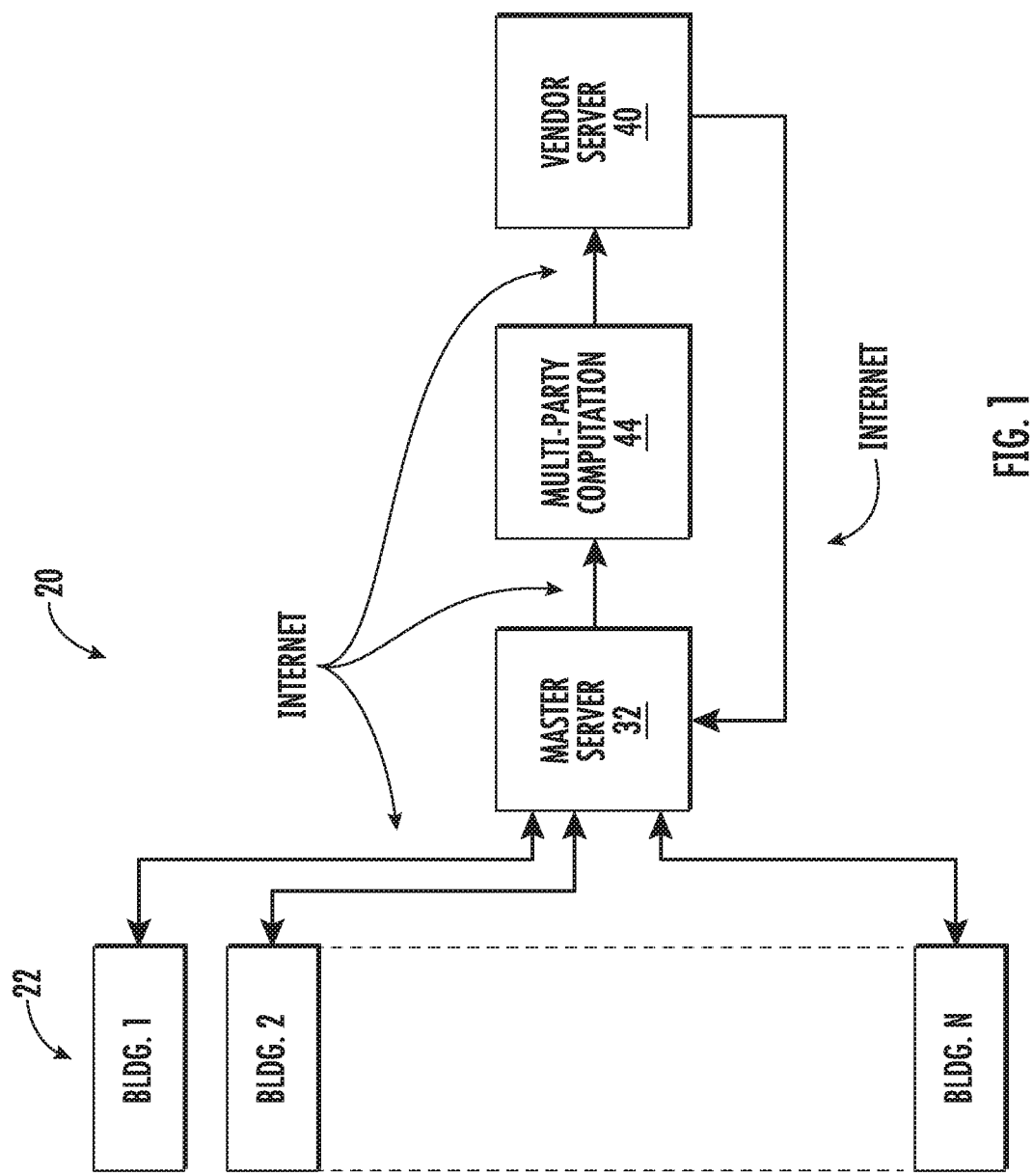
FIG. 1 is a schematic view of communications in an access-control system analytics method and system.
Figure 2:
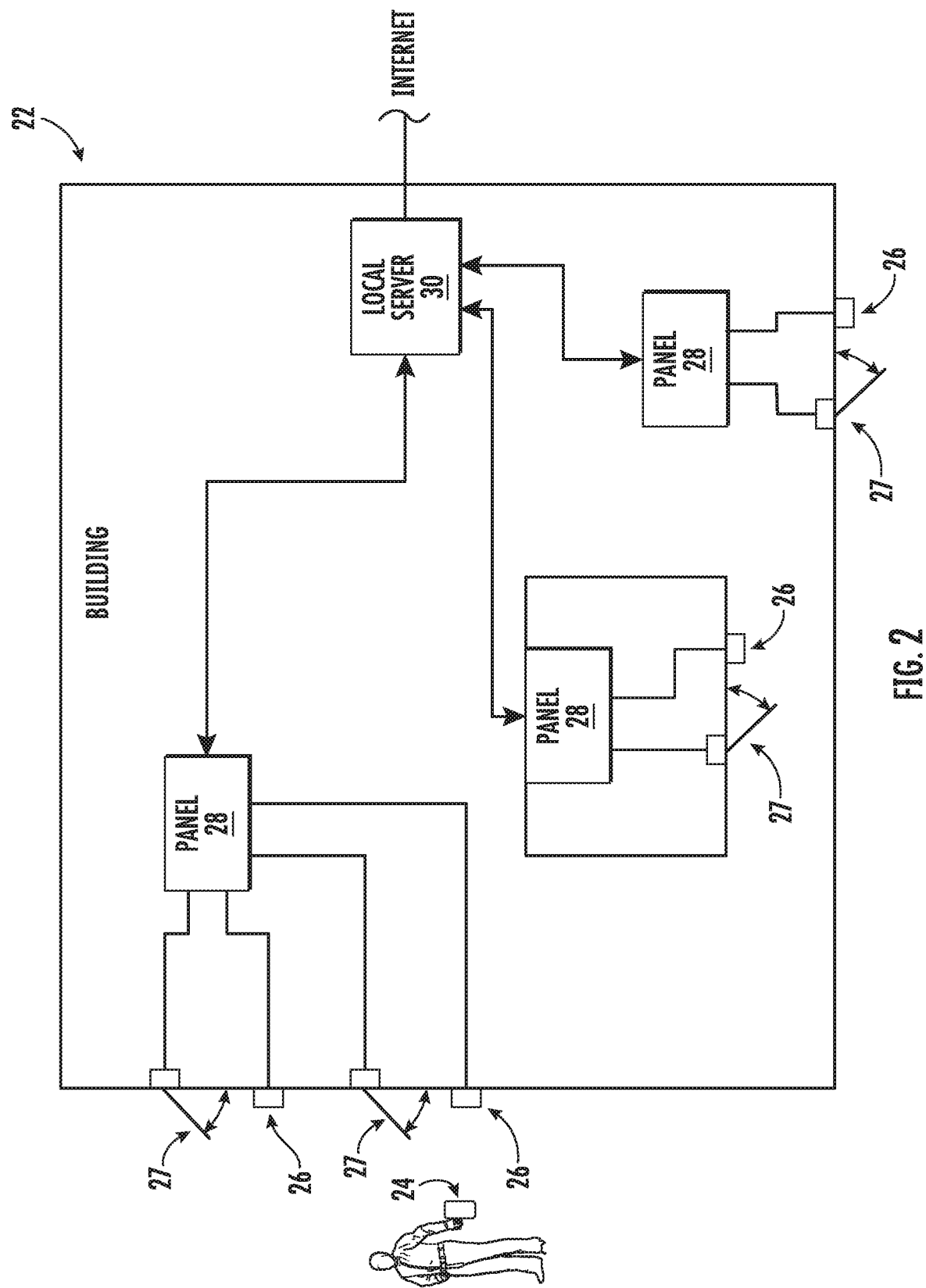
FIG. 2 is a schematic view of an access-controlled building.

An example is given below of a system 20 further comprising: credential readers 26 (FIG. 2) for reading the credentials; access panels 28 controlling the readers and one or more access control devices 27 (e.g., gates, doors, and the like); multiple ACME servers 30, 32 (FIG. 1) for data collection and storage; one or more SecCorp servers 40 for data storage and computation; and communication infrastructure to transmit data collected by the panels to the ACME and SecCorp servers. In this example, it is desired that the SecCorp servers have sufficient access to operational data to perform diagnostics while minimizing chances for compromising employee personal data. As is discussed further below, FIG. 1 shows a secure multi-party computing system 44 intervening between ACME and SecCorp.

In the exemplary system 20, access panels 28 (FIG. 2) and associated readers 26 for reading the credentials of credential devices 24 may be located at one or more perimeter locations or internal locations in a building or complex. Employees may have differing authorizations. For example, all employees may be authorized to enter a building perimeter but only some employees may be authorized to enter certain access-controlled areas within the building. Additional functions may include time-dependent authorizations (e.g., an employee may only enter a given access-controlled area Monday-Friday 7 am to 7 pm or other specific set of business hours or other times associated with shift work). FIG. 3 (discussed below) shows an example access permissions database 110.

An ACME employee who wishes to enter an access-controlled point swipes her/his credential device 24 (e.g. RFID card/badge, etc. or electronic device) at an associated reader 26 which reads the credential device identification number. The associated panel 28 transmits the identification number to the associated local server 30. The local server contains a local copy of a permissions database periodically updated from a master copy of the permissions database on the central master server 32. The local server 30 verifies that the credential is authorized for access to the particular location under the particular circumstances.

If the local server 30 determines that the employee has access to the point, then the local server directs the access panel 28 to open or release the associated door, gate, etc. 27. The panel 28 locally records the event as an access granted event. Otherwise, the door 27 remains closed and the panel 28 records the event as an access denied event. These event records may be stored in a database of the panel 28 and periodically transmitted to the local server 30 (e.g., at a specified time interval or when a given number of events have been recorded). The event records are saved in a database 120 (FIG. 4) at the building local ACME server 30. FIG. 4 (discussed below) shows an example events database stored at the local ACME server 30. The local servers 30 periodically communicate event records to the master ACME server 32, for data storage. The master ACME server 32 is an aggregator of all databases. Exemplary communication is via the internet.

The master ACME server 32 transmits the event records data periodically to the secure multi-party computing system 44 over the internet. The secure multi-party computing system 44 processes the records and sends processed data to the SecCorp server 40 over the internet. The SecCorp server 40 further processes the data and communicates with the ACME master server 32 to monitor and/or control aspects of system operation.

The exemplary badges 24 are secure integrated chip-based contactless passive employee badges. A first example is the HID™ iClass™ from HID Global, Austin, Tex. A second is the MIFARE from NXP B.V./NXP Semiconductors Netherlands B.V., Eindhoven, The Netherlands. Data specific to an employee is stored within the limited memory of the badge as discussed above.

The exemplary readers 26 are such as Blue Diamond Mobile™ readers (Lenel division of UTC Climate, Controls & Security, a unit of United Technologies Corp., Farmington, Conn.). The exemplary readers have the ability to use both RFID cards and Bluetooth mobile device credentials (e.g., BlueDiamond Mobile™ app).

The exemplary access panels 28 are LNL-2220 (MERCURY EP1502) manufactured by the Lenel division of UTC Climate, Controls & Security, a unit of United Technologies Corp., Farmington, Conn.

As discussed above, the exemplary panels 28 receive the credential ID from the badges 24 via the readers 26 but do not have local authorization capability. In real time, the panels communicate the information to the local ACME server 30 (e.g., typically located in the same building). However, any changes to the access permissions may not be communicated immediately by the central master server 32 to all local ACME servers 30. This lag can be a source of errors that SecCorp desires to monitor. The lag may be a designed lag (e.g., the local servers are updated at specific intervals) or an unintended one (e.g., a communications interruption).

Each panel 28 may be connected to the associated local ACME server 30 via Ethernet connection. There may be one or more such servers 30 in a given building or facility. The various local ACME building servers 30 are connected over the internet to master ACME server 32. The exemplary ACME servers 30, 32 are database servers with the ability to communicate data collected over a network to the SecCorp server(s). Data stored in the ACME servers 30 and 32 include records of all past badge swipes at every panel including panel ID, badge ID, whether access was granted or not, and time of swiping. See FIG. 4 for an example events database.

The exemplary SecCorp server(s) 40 are database servers for collecting and storing data from ACME servers and computing servers with the ability to run computations over large amounts of data collected from the ACME servers. SecCorp servers may also be connected to customers other than ACME, for performing similar services.

Thus, it may happen that a panel or a badge might be mis-functioning, and so it may provide incorrect access. Now, if an ACME employee who is authorized to enter a facility is denied access, then it likely means that the badge or the panel is faulty or there is a lack of permissions update. From SecCorp's perspective, they would like to detect which of the badges or panels are faulty to provide proactive maintenance/software updates and the possible nature of any update issue.

The FIG. 3 example access permissions database 110, includes, for each badge in the system, a credential ID field (e.g., badge number). For this purpose, and in this example, an electronic device (e.g., smartphone) credential has a credential ID/badge number. If an employee has both a conventional RFID card-type badge and a smartphone credential, there are two separate entries in the database 110. For each credential device, the database 110 includes one or more fields for attributes of the employee and one or more fields for access authorizations for the employee.

In the illustrated FIG. 3 example, the attribute fields are department, company, and location. Department may indicate a particular department within the company (e.g., the systems department (S), the transportation department (T), and the like). Company may indicate ACME or any of its subsidiaries (e.g., A is ACME, Y is a first subsidiary, and Z is a second subsidiary). In this example, the same department entries are used across all companies. Thus an employee at ACME's systems department or a subsidiary's systems department would be designated by "S" in the department field. Alternative implementations could break these down as S1, S2, and so forth.

Location may indicate the physical/geographical location where the company and its department is present (e.g., with L1-L5 of FIG. 3 each representing a given campus of multiple buildings).

In the illustrated FIG. 3 example, the access authorization fields are panels, readers, and times. Times may indicate specific time windows. These windows may be stored in the database freeform (e.g., start days/times and end days/times) or as predefined windows (e.g., windows associated with particular work shifts). Thus, an exemplary predefined window T1 could be Monday-Friday 08:00-18:00 to broadly cover weekday day shift, T2 could be Saturday and Sunday 08:00-16:00 to cover a weekend day shift, T3 could be Saturday 08:00-16:00 to cover a Saturday day shift, and so forth.

Examples of physical errors involving badges include damage to the badge due to exposure to extreme magnetic fields. This damage may manifest itself as the badge having a different magnetic strength or property and therefore a reader is unable to successfully read the badge ID number. For magnetic stripe badge, an example is malfunctioning due to exposure to extreme magnetic fields such as if they are stored close to a cell phone for an extended time. In these particular examples, the nature of the damage and the credential device protocol is such that when a faulty device is swiped the reader may detect the presence of something without logging the credential ID. For example, it is easy to envision a damaged magnetic card providing gibberish input to the reader.

Examples of physical errors involving panels include communication failures between panel and local ACME server or between the local ACME server and ACME master server. For example, a transmission control protocol (TCP) may be used to send streams of data between the panel and local ACME server and/or between the local ACME server and the ACME master server. Because packet transfer often is not reliable, a technique known as "positive acknowledgement with re-transmission" (PAR) may be used to guarantee reliability. PAR requires the receiver to respond with an acknowledgement message as it receives the data. The sender keeps a record of each packet it sends and maintains a timer from when the packet was sent. The sender re-transmits a packet if the timer expires before receiving the message acknowledgement. The timer is needed in case a packet gets lost or corrupted.

The exemplary FIG. 4 events database 120 has, for each event, exemplary fields of: event type, credential ID, time, reader ID, panel ID, readtype, and the like. Exemplary event types include access granted, access denied, communications lost from reader to panel, and communications lost from panel to server.

The two types of loss of communication events may be determined using the PAR technique described above.

Read type entries, may refer to the type of access attempt (RFID reader vs. Bluetooth). This allows consideration of multi-mode readers discussed above, A badge or other credential device may be deemed faulty if the reader is not able to read the credential ID when the device is swiped at the reader (rows 5 and 6 in the example database of FIG. 4). Therefore, the panel stores the corresponding entry under the credential ID field as "NULL". For example, if the goal is to compute the number of times faulty devices are swiped, then the master server 32 creates a new column (FIG. 5) in an augmentation 130 of the events database 120 whose denotes the data under column of credential ID as "1" whenever the entry is "NULL" and "0" otherwise. Then the number of times faulty devices are swiped is equal to the sum of the entries in the new column.

Figure 6:
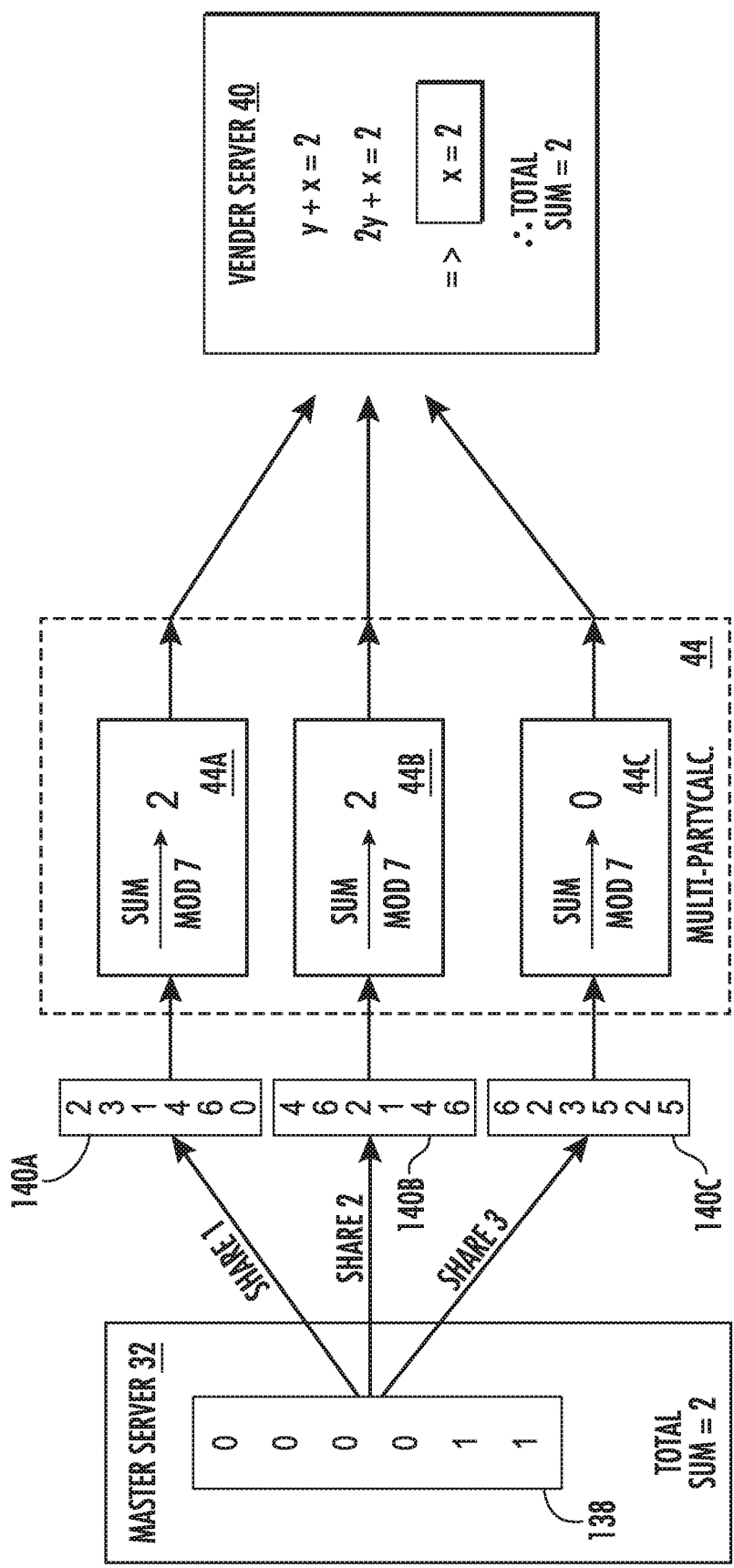
FIG. 6 is a schematic view of stages of database processing.

In a basic example, the secure multiparty computation 44 from FIG. 1 works for this problem. To compute the sum of the entries in the new column of the events database in FIG. 5, the master server 32 computes multiple shares of the new column. Suppose for illustrative purposes, the secure multiparty computation 44 involves 3 servers 44A, 44B, 44C (FIG. 6) that do not interact with each other. As shown in FIG. 6, the master server 32 creates 3 shares (140A, 140B, 140C) of the new column 138 as follows. The server randomly selects a set of unique integer coefficients using a random number generator. In this example, the number of coefficients is equal to the number of rows or entries in the column. The domain of the coefficients is from 1 to a prime number equal to or greater than the number of entries. For example with six rows, seven could be the prime number and an example of the coefficient set is (2, 3, 1, 4, 5, 6). The true data is (0, 0, 0, 0, 1, 1), which implies that the true sum is equal to 2. The first share is computed by adding these random coefficients to each entry of the true data. Therefore, the first server receives (2, 3, 1, 4, 6, 0), where the result is computed in modulo 7 (the aforementioned prime number). The second share is computed by adding twice the values of the random coefficients to the true data, (i.e., the second server receives (4, 6, 2, 1, 4, 6)). The third share is computed by adding thrice the values of the random coefficients to the true data, i.e., the third server receives (6, 2, 3, 5, 2, 5). Now each server computes the sum of the numbers it has received in modulo 7—the first server obtains the answer 2, the second server obtains the answer 2, the third server obtains the answer 0. All three servers communicate their answers to the vendor server 40. The vendor server aggregates any two of these three answers and solves a system of two linear equations in two unknowns to find the true answer 2. For example, the vendor solves the linear system of equations y+x=2, 2y+x=2 to obtain x=2.

In a more detailed example, the secure multiparty computation 44 from FIG. 1 works for a more detailed diagnosis such as to determine the number of access denied events in the events database from FIG. 4 that are not due to a faulty badge. In this case, the master server 32 computes two new columns (FIG. 7) in the augmented/modified database 130': "New Event" (column 138 discussed above): and "New Event Type" (column 139). The data in column 139 is "0" whenever the event type is "access denied" and is equal to "1" otherwise. The master server 32 first adds the entries in the two columns 138 and 139 to obtain the true data (1, 0, 1, 1, 1, 1) and then computes its complement (replace 0 by 1 and 1 by 0), to obtain (0, 1, 0, 0, 0, 0). Then, the total number of access denied events that are not due to a faulty badge are equal to the number of is in this new sequence (0, 1, 0, 0, 0, 0).

The server 32 then divides this new sequence into shares for the multi-party computation as follows. The server 32 randomly selects a set of unique integer coefficients using a random number generator. In this example, the number of coefficients is equal to the number of rows or entries in the column. The domain of the coefficients is from 1 to a prime number equal to or greater than the number of entries. For example with six rows, seven could be the prime number and an example of the coefficient set is (2, 3, 1, 4, 5, 6). The true data is (0, 1, 0, 0, 0, 0), which implies that the true sum is equal to 1. The first share is computed by adding these random coefficients to each entry of the true data. Therefore, the first server receives (2, 4, 1, 4, 5, 6) where the result is computed in modulo 7 (the aforementioned prime number). The second share is computed by adding twice the values of the random coefficients to the true data, (i.e., the second server receives (4, 0, 2, 1, 3, 5)), where the result is computed in modulo 7 (the aforementioned prime number). The third share is computed by adding thrice the values of the random coefficients to the true data, i.e., the third server receives (6, 3, 3, 5, 1, 4).

The server 32 passes the shares to the servers 44A-44C. Each server 44A-44C then computes the sum of the numbers it has received in modulo 7—the first server obtains the answer 1, the second server obtains the answer 1, the third server obtains the answer 1. All three servers 44A-44C communicate their answers to the vendor server 40. The vendor server aggregates any two of these three answers and solves a system of two linear equations in two unknowns to find the true answer 1. For example, the vendor server 40 may solve the linear system of equations y+x=1, 2y+x=1 to obtain x=1.

In another more detailed example, the secure multiparty computation 44 from FIG. 1 works for more detailed diagnosis such as to determine the sum of: (a) the number of access denied events in the events database from FIG. 4 in which access should have been allowed; and (b) the number of access granted events in which the access should not have been allowed. In this case, the master server 32 computes four new columns (FIG. 8) in the augmented/modified database 130'': "New Event Type" (column 139 discussed above), "Access Assigned" (column 140) and "Complement of New Event Type" (column 141) and "Complement of Access Assigned" (column 142). The data in column 138 is "0" whenever the event type is "access denied" and is equal to "1" otherwise. The data in column 140 is equal to "1" when the particular credential ID in a row is assigned access to the particular reader ID in that row at the recorded time instant, as per the panel/server access permissions database 110 in FIG. 3, and is equal to "0", otherwise. For example, the very first row in FIG. 8 has credential ID 123 which was granted access to reader ID R1 at 11:00 on 2018/02/08, as per the first entry in database 110. Therefore, the first entry under column 140 has been set equal to "1". The data in column 141 is the complement of the data in column 139. The data in column 142 is the complement of the data in column 140—in the case of a NULL entry, the complement is recorded as NULL.

Figure 8:
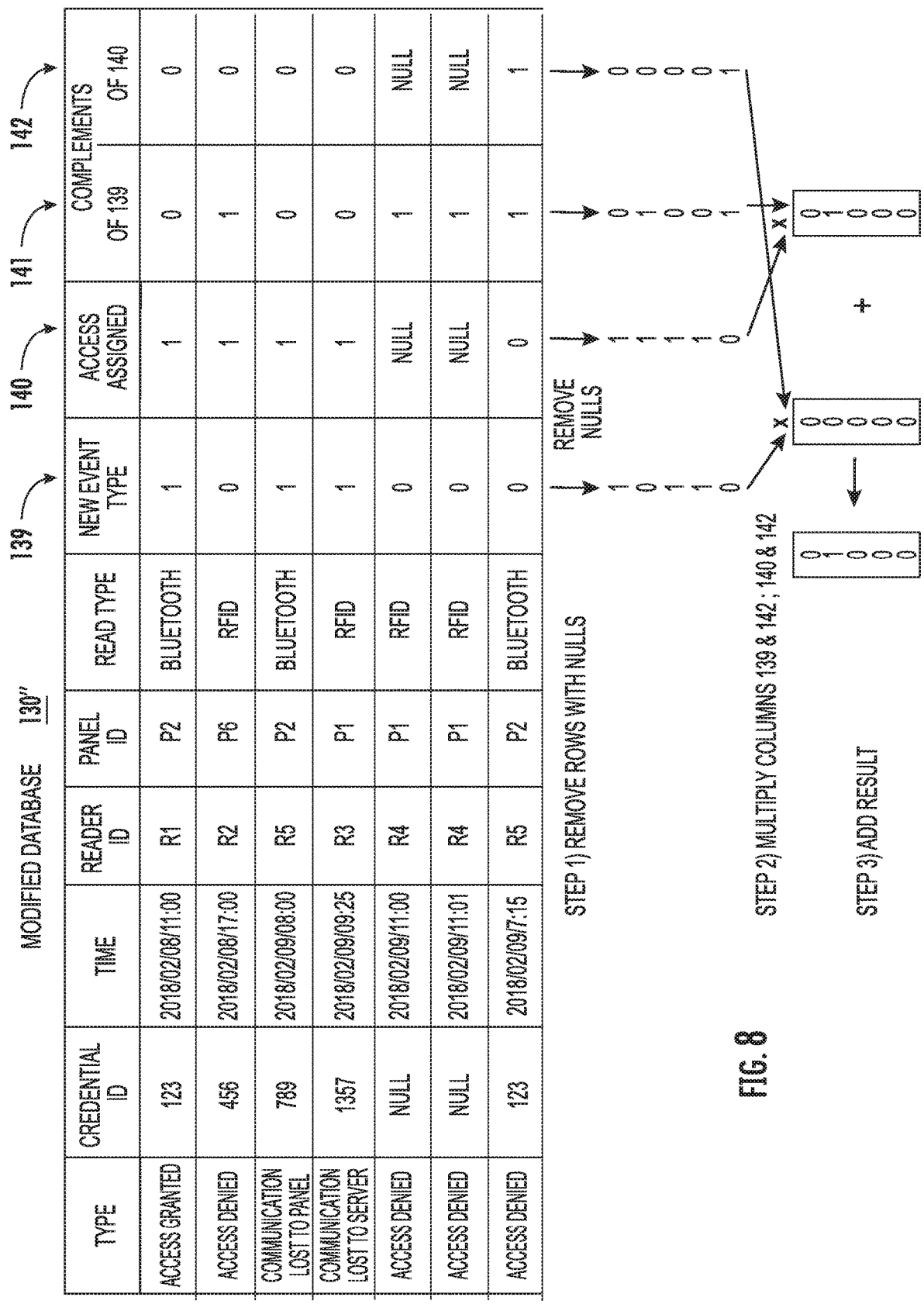
FIG. 8 is a tabular diagram of an alternative modification/augmentation of the event records database of FIG. 4.

In the beginning, the master server 32 first removes the rows corresponding to the entries that contain "NULL" (step 1 in FIG. 8). Among the remaining entries, server 32 multiplies the entries in column 139 with the entries in column 142 and multiplies the entries in column 140 with the entries in column 141 (step 2 in FIG. 8). Finally, server 32 adds the result to obtain (0, 1, 0, 0, 0) (step 3 in FIG. 8). Then, the total number of access denied events in the events database from FIG. 4 in which access was allowed and the number of access granted events in which the access was not allowed is equal to the sum of the entries in the final sequence (0, 1, 0, 0, 0).

The server 32 then divides this new sequence into shares for the multi-party computation as follows. The server 32 randomly selects a set of unique integer coefficients using a random number generator. In this example, the number of coefficients is equal to the number of rows or entries in the column. The domain of the coefficients is from 1 to a prime number equal to or greater than the number of entries. For example with five rows, seven could be the prime number and an example of the coefficient set is (2, 3, 1, 4, 5). The true data is (0, 1, 0, 0, 0), which implies that the true sum is equal to 1. The first share is computed by adding these random coefficients to each entry of the true data. Therefore, the first server 44A receives (2, 4, 1, 4, 5) where the result is computed in modulo 7 (the aforementioned prime number). The second share is computed by adding twice the values of the random coefficients to the true data, (i.e., the second server 44B receives (4, 0, 2, 1, 3)), where the result is computed in modulo 7 (the aforementioned prime number). The third share is computed by adding thrice the values of the random coefficients to the true data (i.e., the third server 44C receives (6, 3, 3, 5, 1)).

The server 32 thus passes the shares to the servers 44A-44C. Each server 44A-44C then computes the sum of the numbers it has received in modulo 7. In this example, the first server obtains the answer 1, the second server obtains the answer 1, and the third server obtains the answer 1. All three servers 44A-44C communicate their answers to the vendor server 40. The vendor server aggregates any two of these three answers and solves a system of two linear equations in two unknowns to find the true answer 1. For example, the vendor server 40 may solve the linear system of equations y+x=1, 2y+x=1 to obtain x=1.

With this information (the value of x), the server 40 then communicates back to ACME master server 32. With the three examples above being performed separately or at once, this may include one or more of: (1) the number of faulty badges in ACME's system (FIGS. 5&6); (2) the number of access denied events in the events database 120 that are not due to a faulty badge (FIG. 7); and (3) the sum of access denied events in the events database from FIG. 4 in which access should have been allowed and the number of access granted events in which the access should not have been allowed (FIG. 8). For this purpose, neither the vendor server 40 nor any of the third party servers 44A-C require access to the panel/server access permissions database 110 from FIG. 3, thereby preserving privacy of ACME's employees, while still providing an accurate result of the computation to master server 32 (ACME).

The technique discussed in this invention applies in a straightforward manner to other queries of interest to Sec-Corp such as determining the fraction of events that have the read type as "Bluetooth".

The technique also applies to more complex queries of interest to SecCorp such as determining the credential IDs of faulty credential devices in the events database. In an example, the underlying assumption is that the credential ID is successfully recorded after multiple swipes that happen within a specified short duration of each other and which have the same reader ID (FIG. 9). This logic is encoded by introducing a plurality of columns (shown as 150-1 through 150-5 for the exemplary 5 readers) to the database 120 (e.g., of FIG. 4) respectively corresponding to each unique reader ID. The FIG. 9 example uses slightly different data than the FIG. 4 example to illustrate this example. Each of these columns 150-1 et seq. encodes, in the row of the successful attempt, a value that indicates whether the attempt was preceded by the threshold number/type/timing/etc. of unsuccessful attempts.

The populating of the added columns 150-1 et seq. is based on the server 32 looking back from each successful attempt. The server 32 looks to see if on the same reader immediately prior to the successful attempt, there were a threshold number of consecutive unsuccessful attempts of the same read type as the successful attempt within a threshold time period. The thresholds may be determined by monitoring user habits. Further variations may include thresholds on specific intervals between those individual attempts.

In one example, the entries in these columns are 1 or 0 with 1 indicating the thresholds were met (thus encoding the event of multiple swipes within short duration of each other followed by a valid credential ID) and 0 indicating not met (not sufficiently evidencing a failed credential device). In one example, the unsuccessful attempt rows automatically have a 0 in the associated column and the columns for the other readers also have a 0. Thus, in FIG. 9, there is a 1 in a cell of column 150-4 indicating a threshold met for that successful attempt to use credential 456 at reader R4.

Each of these columns 150-1 et seq. is then divided by the server 32 into shares as discussed in the examples above. The server 32 passes these shares to the multi-party calculation (separately done for each column) which then passes the processed data to the SecCorp server. In this example, the reader ID is passed with the data in both stages. Finally the SecCorp server combines for each column and then communicates back to the ACME server 32 the number of times a faulty credential successfully accessed after threshold failures at that reader, along with the associated reader ID so that the ACME server 32 can identify the particular readers that encountered faulty credential devices. In this example, there is no distinction between unique credential devices. If, over the relevant period for a given reader, assume a single device has four instances of successful admission/entry immediately preceded by the threshold failures and no other devices have met the threshold condition. The returned information will be no different than if two devices each had met the threshold condition twice.

ACME server 32 then uses this information together with the panel/server access permissions database 110 to first identify potential badges that may be faulty. As an example, consider the database in FIG. 9 in which the final three events are the ones under consideration. In this case, Sec-Corp communicates to ACME that reader R4 has a potential faulty badge getting swiped at it. ACME then uses this information to look up which credential devices have been granted access to R4 from the panel/server access database in FIG. 3, and recalls them for a further detailed diagnosis. This diagnosis reveals the particular defective credential device(s).

A further example involves determining a faulty reader. If the abovementioned detailed diagnosis on every credential device that has been granted access to R4 (from FIG. 3) reveals that every credential device is in fully working condition, then the ACME server 32 concludes that the fault lies in reader R4. As in the previous queries, for this purpose, neither the vendor server 40 nor any of the third party servers 44A-C require access to the panel/server access permissions database 110 from FIG. 3, thereby preserving privacy of ACME's employees, while still providing valuable result of the computation to master server 32.

It is possible that many such diagnoses may be performed directly by software on the server 32. However, this may require maintenance of raw data on the server 32. Passing the data through the multi-party computation to the vendor (SecCorp) while deleting the raw data, may allow the SecCorp server 40 to perform longer term processes on the relatively sanitized data it has access to while reducing the risk from hacking of server 32.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A method comprising:
   maintaining, by one or more servers, a database (120, 130) of access control events, wherein the access control events involve a plurality of access-controlled points at a plurality of buildings;
   dividing, by the one or more servers, a portion (138) of the database into shares (140A, 140B, 140C), wherein the portion of the access events data contains evidence of a malfunctioning device, the evidence of a malfunctioning device comprising evidence of at least one of: physical damage to the malfunctioning device; and faulty performance of the malfunctioning device;
   passing, by the one or more servers, the respective shares to respective third party servers (44A, 44B, 44C);

processing the shares in the respective third party servers, wherein the dividing and the processing the shares in the third party servers limits effects of potential data compromise;

passing output of the processing from the third party servers to a further server (40); and processing the output on the further server.

2. The method of claim 1 wherein:
the processing the output on the further server includes combining the shares.

3. The method of claim 1 wherein:
the processing comprises diagnosing the malfunctioning device.

4. The method of claim 3 wherein:
the diagnosing the malfunctioning device comprises diagnosing a malfunction in a credential device for accessing the access-controlled points.

5. The method of claim 3 wherein:
the diagnosing the malfunctioning device comprises diagnosing a malfunction in a reader.

6. The method of claim 1 wherein:
the portion of the access events data contains credential holder identifying information wherein the credential is used to access the access-controlled points.

7. The method of claim 6 wherein:
the dividing obscures the credential holder identifying information.

8. The method of claim 5 wherein:
each of the plurality of readers is at an associated access point of said plurality of access-controlled points.

9. The method of claim 3 wherein:
the results of the processing on the further server are communicated to the one or more servers; and
the one or more servers are used to identify the malfunctioning device.

10. The method of claim 1 wherein:
the results of the processing on the further server are communicated to the one or more servers; and
the one or more servers are used to identify the malfunctioning device.

11. An access control system (20), the access control system comprising:
a plurality of credential devices (24);
a plurality of readers (26) at access-controlled points at a plurality of buildings for reading the credential devices; and
one or more servers (30, 32) coupled to the readers and programmed to:
maintain an access events database (120, 130) involving access to said access-controlled points;
divide a portion (138) of the access events database into shares (140A, 140B, 140C), wherein the portion of the access events data contains evidence of a malfunctioning device, the evidence of a malfunctioning device comprising evidence of at least one of:
physical damage to the malfunctioning device, and
faulty performance of the malfunctioning device; and
pass the respective shares to respective third party servers (44A, 44B, 44C), wherein the dividing and passing the shares to the third party servers limits effects of potential data compromise.

12. The system of claim 11 wherein:
the plurality of credential devices includes smartphones and RFID cards or badges.

13. The access control system of claim 11 wherein:
each of the plurality of readers is at an associated access point of said plurality of access-controlled points.

14. The system of claim 11 wherein:
the one or more servers are configured to receive further processed output from the third party servers as processed by a further server and wherein the one or more servers are configured to identify the malfunctioning device.

15. A method for using an access control system (20), the access control system comprising:
a plurality of credential devices (24);
a plurality of readers (26) at access-controlled points at a plurality of buildings for reading the credential devices; and
one or more servers (30, 32) coupled to the readers and programmed to:
maintain an access events database (120, 130) involving access to said access-controlled points;
divide a portion (138) of the access events database into shares (140A, 140B, 140C), wherein the portion of the access events data contains evidence of a malfunctioning device, the evidence of a malfunctioning device comprising evidence of at least one of:
physical damage to the malfunctioning device, and
faulty performance of the malfunctioning device; and
pass the respective shares to respective third party servers (44A, 44B, 44C), the method comprising:
maintaining, by the one or more servers, the access events database;
dividing, by the one or more servers, the portion of the access events database into the shares; and
passing, by the one or more servers, the respective shares to the respective third party servers, wherein the dividing and the passing the shares to the third party servers limits effects of potential data compromise.

16. The method of claim 15 further comprising:
the plurality of credential devices includes smartphones and RFID cards or badges.

17. The method of claim 16 wherein:
the portion of the access events data contains credential holder identifying information.

18. The method of claim 15 further comprising:
receiving, by the one or more servers, further processed output of the third party servers as processed by a further server and wherein the one or more servers are used to identify the malfunctioning device.

* * * * *